Inventor.
Edward A. Johnston,

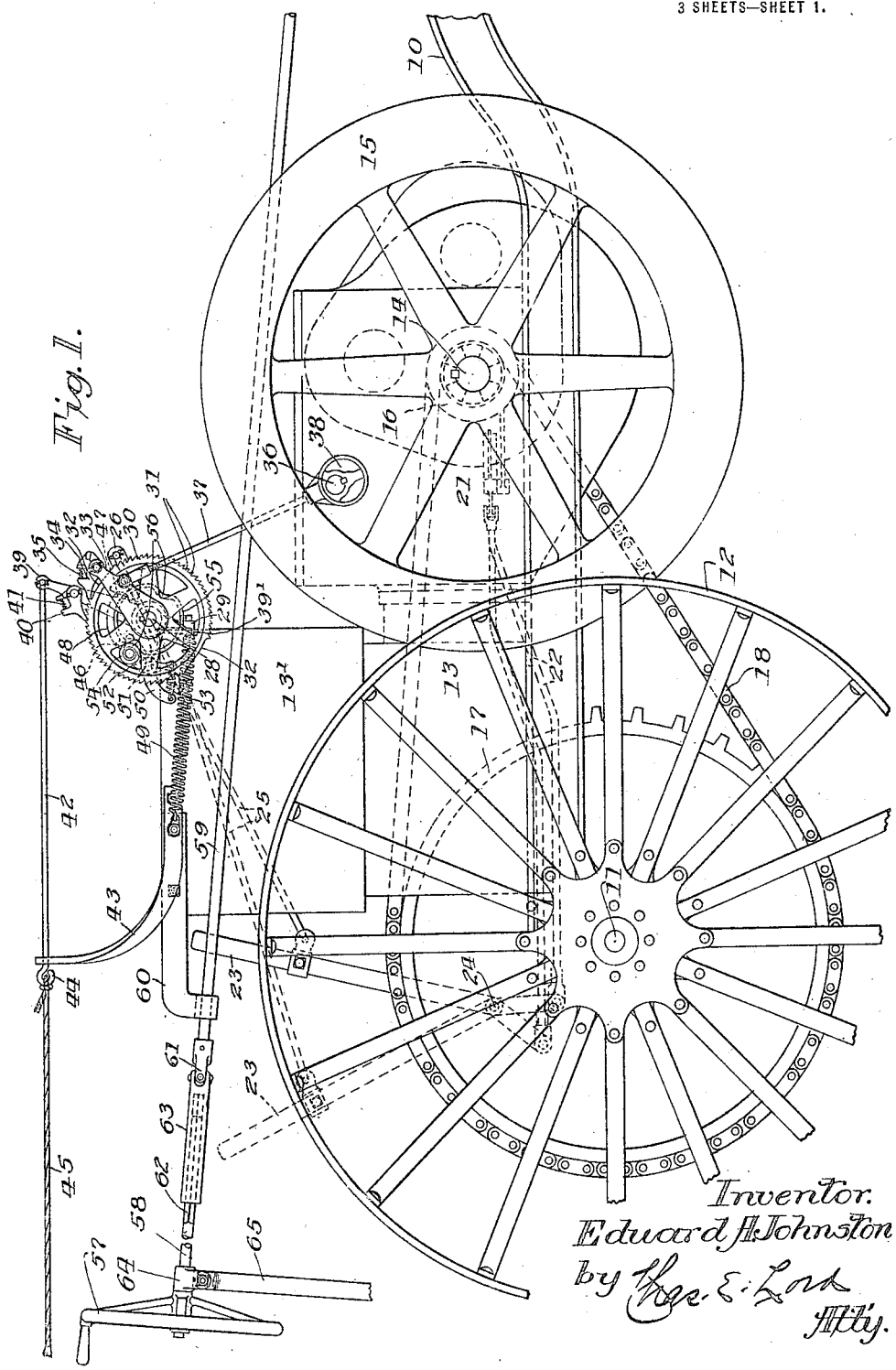

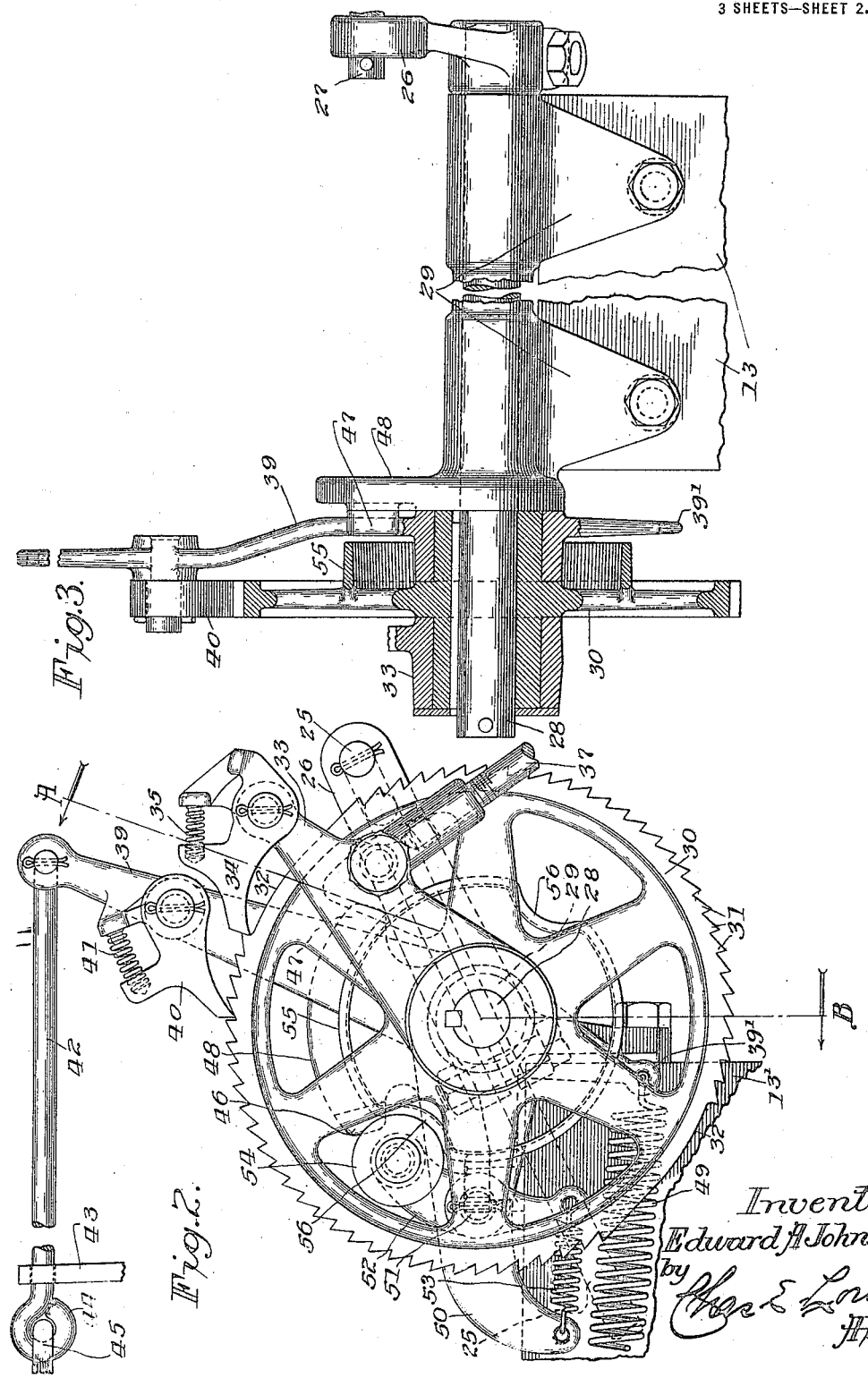

UNITED STATES PATENT OFFICE.

EDWARD A. JOHNSTON, OF CHICAGO, ILLINOIS, ASSIGNOR, BY MESNE ASSIGNMENTS, TO INTERNATIONAL HARVESTER COMPANY, A CORPORATION OF NEW JERSEY.

TRACTOR CONTROL.

1,419,264.      Specification of Letters Patent.      Patented June 13, 1922.

Application filed March 18, 1918. Serial No. 223,217.

*To all whom it may concern:*

Be it known that I, EDWARD A. JOHNSTON, a citizen of the United States, residing at Chicago, in the county of Cook and State of Illinois, have invented certain new and useful Improvements in Tractor Controls, of which the following is a full, clear, and exact specification.

This invention relates to remote control means for vehicles and more especially for tractors.

An object of this invention is to provide means whereby one piece of mechanism, such as a tractor, may be controlled from another, such as a binder, operatively connected to the first.

Another object is to provide means for throwing a clutch in or out by power actuated mechanism, the operator merely acting to set the mechanism in motion.

Another object is to provide means for starting or stopping a tractor from a point outside the tractor while the tractor engine is in operation.

These and other objects will be apparent from the following description of the embodiment of my invention illustrated by the accompanying drawings in which Fig. 1 represents a partial side elevation of a tractor with the clutch control mechanism mounted thereon;

Fig. 2 is an end elevation of the power operating shaft of the clutch control mechanism shown in a locked position;

Fig. 3 is a front elevation of the same shaft partly in section taken on the line A—B of Fig. 2;

Figure 4:
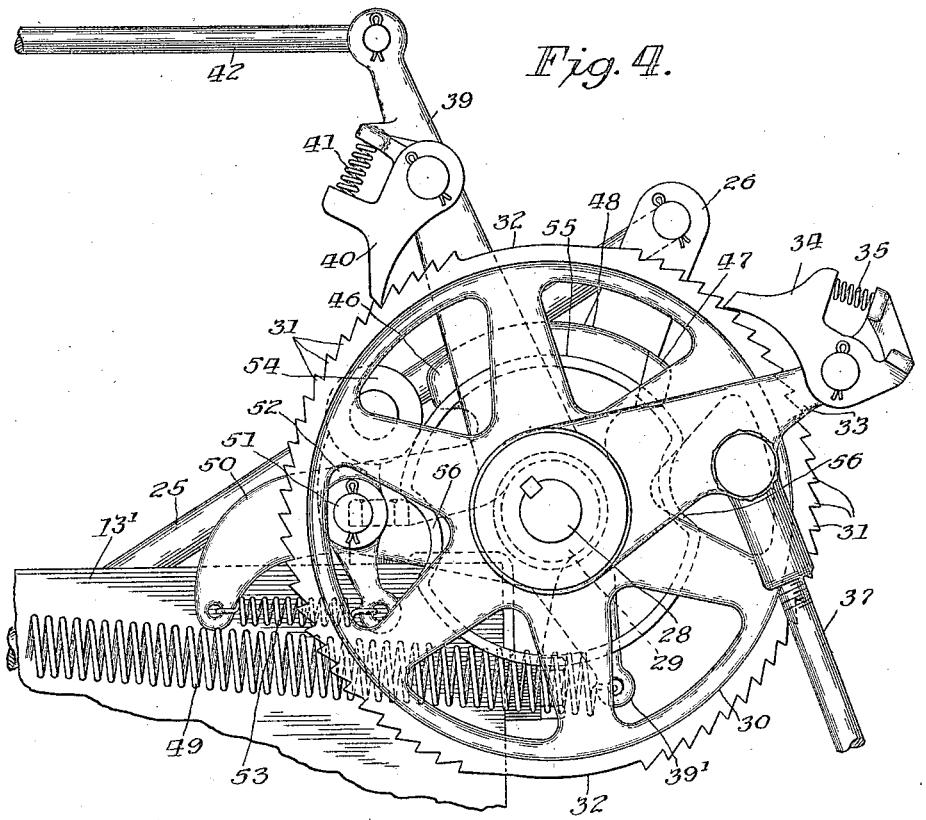
Fig. 4 is the same as Fig. 2 but with the ratchet partly revolved by the hand operating lever.
Figure 5:
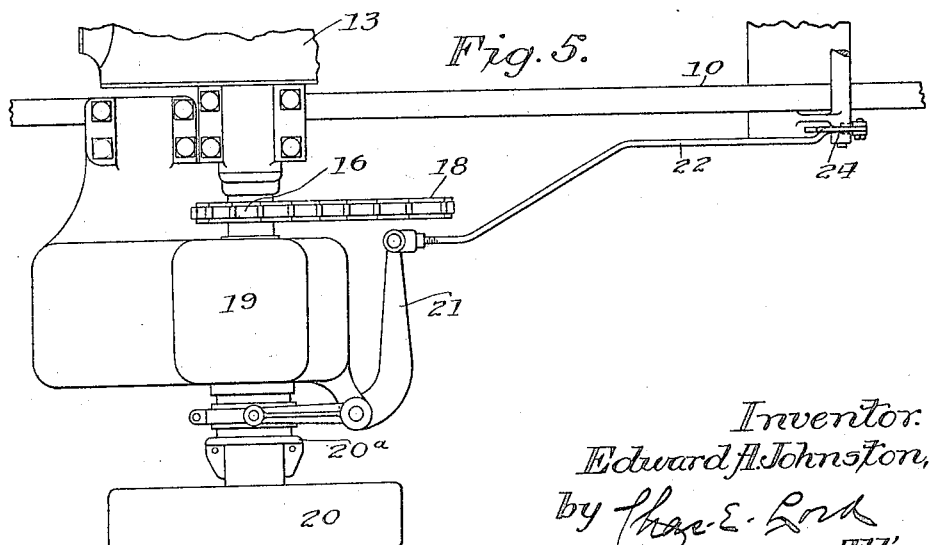
Fig. 5 is a vertical plan view of the tractor showing the tractor clutch and the lever for operating same.

The tractor as shown has a frame 10 supported at the rear end upon a shaft 11, upon which are mounted the traction wheels 12. Upon the frame 10 is also mounted an internal combustion engine 13 having a crank shaft 14 on which is keyed the fly wheel 15. By means of suitable mechanism the shaft 14 is made to drive a sprocket 16 which in turn drives the sprocket 17 secured to the traction wheel by means of the sprocket chain 18. The sprocket 16 may be disconnected from the geared driving mechanism contained in the gear case 19 by means of the friction clutch 20. One end of a bell crank 21 operatively engages this clutch while the other end is hingedly connected to a rod 22 which is pivotally connected to the hand operating lever 23 fulcrumed at 24. To the upper part of this lever is also hingedly mounted a rod 25 which is similarly mounted upon the end of the crank 26, which is secured to the shaft 28. This shaft is journaled in bearings 29 which are bolted to the cooling hopper 13'. The opposite end of this shaft has keyed thereon a ratchet wheel 30 having teeth 31 upon the greater part of its periphery, but having also two smooth spaces at opposite sides thereof, the purpose of which will be hereinafter explained.

The ratchet wheel has two finished hubs upon which are journaled the two levers 33 and 39. The lever 33 has hingedly mounted thereon at its outer end a dog 34 which is held against the teeth of the ratchet wheel 30 by the spring 35. This lever is operatively connected to the engine cam shaft 36 by means of connecting rod 37, which is hingedly connected at one end to the ratchet lever and at the opposite end to an eccentric 38 which is keyed to the engine cam shaft. The other lever 39 journaled upon the other hub of the ratchet wheel, carries a dog 40 and a spring 41 similar to those described in connection with the other lever. The outer end of this lever has hingedly mounted thereon one end of a rod 42, the other end of which passes through a bracket 43 carried by another part of the engine frame. This end of the rod 42 also has an eye 44 to which is attached a rope or other flexible member 45.

The movements of the lever 39 are limited by two lugs 46 and 47 upon an extension 48 of the bearing 29. The lower end 39' of the lever 39 has an eye to which is attached a spring 49 which normally holds the lever against the lug 47, as shown in Fig. 2. The extension of the bearing 48 also carries an arm 50 to which is pivotally connected at 51 the locking lever 52. At the lower end of this lever is an eye to which is attached a spring 53, the other end of the spring being fastened to an eye in the end of the arm 50. The other end of this locking lever carries a roller 54 which is adapted to roll on the flange 55 formed integral with the ratchet 30. This flange also carries two depressions 56, into which the roller 54 may fall and cause the ratchet to be locked in the position shown in Fig. 2, wherein the dog 34 will fall upon one of the open spaces 32. The eccentric 38 causes the arm 33 and the dog 34 to be continuously oscillated, but owing to the fact that the dog 34 now falls upon the open space 32, the ratchet remains stationary in either the engaged or disengaged position of the clutch 20.

The implement to be operated is not shown, but is drawn by the tractor, the driver being preferably seated upon this implement. The steering of the tractor is accomplished by a hand wheel 57 placed convenient to the driver's seat and mounted upon an extension shaft 58 which is connected with the regular tractor steering shaft 59 which is operatively connected at its forward end with the tractor steering mechanism and supported at its rear end by a bracket 60.

Provision is made to meet the relative swinging movements of the implement with respect to the tractor, by placing between the extension steering shaft 58 and the regular steering shaft 59, a universal joint 61, and means whereby the two shafts may be allowed to shift endwise, such as a squared or splined extension 62 of the shaft 58 made slidable in a similarly shaped sleeve 63. The shaft 58 is also mounted for universal movement in a bearing 64, mounted upon a standard 65 which is carried by the implement to be drawn.

When in operation the tractor is hitched to this implement, the driver is preferably seated on the implement with the steering wheel 57 and the clutch control or rope 45 conveniently located. The tractor engine is started in the usual way with the operating clutch 20 thrown out and the clutch operating mechanism with the parts in the position shown in Fig. 2. When it is desired to move forward, the driver pulls upon the rope 45, causing the lever 39 to be drawn over into the position shown in Fig. 4. In doing so the dog 40 engages the teeth of the ratchet and causes the ratchet to be pulled over into the position also shown in Fig. 4, wherein the dog 34 on the oscillation lever 33 engages other teeth upon the ratchet 30. As the ratchet arm 33 oscillates, the dog 34 will therefore urge the ratchet around until the next open space 32 is reached, when the dog 34 once more becomes inoperative and the roller 54 drops into the corresponding notch 56. During the operation of pulling forward on the lever 39 this roller 54 is forced up upon the outer circular part of the drum 55 against the action of the spring 53, which is carried upon the opposite end of the lever 52, upon which this roller is mounted. The opposite end of the lever 39 also has an eye 39' in which is mounted the spring 49, so that when the rope 45 is released, this spring tends to return the lever 39 to the position shown in Fig. 2.

The result of rotating the ratchet wheel 30 a half revolution from the position shown in Fig. 2, is that the crank 26 which is keyed to the shaft 28, is also rotated one-half revolution from the position shown in Fig. 2, and the rod 22 is pushed forward so that the bell crank 21 causes the operating mechanism of the tractor clutch 20 to be thrown in, and the tractor moves forward. The guiding of the tractor as already explained, is accomplished from the driver's seat on the implement by means of the hand wheel 57. When it is desired to stop the tractor the operator again pulls upon the rope 45 and substantially the same series of operations take place, except that the crank 26 is now returned to the position shown in Fig. 2 and the operating mechanism 20ª of the tractor clutch 20 is thrown out and the clutch released.

While I have shown and described a single form of my invention, it is to be understood that it is capable of many modifications. Changes, therefore, in the construction and arrangement of parts may be made without departing from the spirit and scope of the invention as defined in the appended claims.

What I claim as my invention and desire to secure by Letters Patent is:—

1. In a tractor, the combination of an engine and traction means, a clutch for transmitting power from the engine to the traction means, means for operating the clutch, an actuating member continuously driven from the engine, control means adapted, when actuated by the operator of the tractor, to connect the actuating member and clutch operating means, whereby the clutch will be engaged or disengaged, and means for disconnecting the actuating member and clutch operating means when the position of the clutch has been changed.

2. In a device of the class described, the combination of a tractor having an engine and traction means, a clutch for transmitting power from the engine to the traction means, means driven from the engine for engaging and disengaging the clutch, mechanically operated means for connecting the driven means and clutch to actuate the clutch, and automatically operating means for disconnecting the driven means and clutch when the clutch has been actuated.

3. In a clutch operating mechanism, a clutch, a shaft, a source of power and operating means whereby the source of power may be applied to the clutch to throw in the clutch on one half revolution of the shaft and to throw out the clutch on the other half revolution thereof.

4. In a clutch operating mechanism, a clutch, a shaft, a source of power and operating means whereby the source of power may be applied to the clutch to throw in the clutch on one half revolution of the shaft and to throw out the clutch on the other half revolution thereof, and means for locking at each half revolution.

5. In a clutch operating mechanism, a clutch, a shaft, a source of power and operating means whereby the source of power may be applied to the clutch to throw in the clutch on one half revolution of the shaft and to throw out the clutch on the other half revolution thereof, and means for rendering the operating means inoperative at each half revolution.

6. In a clutch operating mechanism, a clutch, a shaft, a source of power and operating means whereby the source of power may be applied to the clutch to throw in the clutch on one half revolution of the shaft and to throw out the clutch on the other half revolution thereof, means for rendering the operating means inoperative at each half revolution, and means for locking at each half revolution.

7. In a tractor having an engine, ground engaging tractor means, a clutch for connecting the engine with the tractor means, means driven by the engine and operable from a point outside the tractor for engaging and disengaging said clutch, and means for locking the clutch in the engaged and disengaged positions.

8. In combination, a tractor having an engine, and adapted to propel a vehicle, means for steering the tractor from the vehicle, clutch mechanism for transmitting power from the engine to the tractor, clutch controlling means comprising an interrupted ratchet gear operatively connected to the clutch and means for controlling the operation of said gear from the vehicle.

9. In combination, a tractor having a propelling engine and a power clutch, means for steering the tractor adapted to be mounted on a vehicle, and means for controlling the tractor from the vehicle including means driven by the engine for connecting said clutch by the manual operation of an element of said last named means, and disconnecting said clutch by a similar operation of the same element.

In testimony whereof I affix my signature.

EDWARD A. JOHNSTON.